US006343317B1

(12) United States Patent
Glorikian (10) Patent No.: US 6,343,317 B1
(45) Date of Patent: Jan. 29, 2002

(54) INTERNET SYSTEM FOR CONNECTING CLIENT-TRAVELERS WITH GEOGRAPHICALLY-ASSOCIATED DATA

(76) Inventor: Harry A. Glorikian, 49 Waverley St., Belmont, MA (US) 02478

( * ) Notice: Subject to any disclaimer, the term of this patent is extended or adjusted under 35 U.S.C. 154(b) by 0 days.

(21) Appl. No.: 09/474,458

(22) Filed: Dec. 29, 1999

(51) Int. Cl.[7] .............................................. G06F 15/16
(52) U.S. Cl. ..................... 709/218; 709/229; 455/456
(58) Field of Search ............................. 709/217, 218, 709/229; 455/456, 457; 340/825.44; 342/357.06–357.09

(56) References Cited

U.S. PATENT DOCUMENTS

| 5,317,321 A | * | 5/1994 | Sass ........................... 342/176 |
| 5,541,845 A | * | 7/1996 | Klein .......................... 701/207 |
| 5,552,989 A | * | 9/1996 | Bertrand ..................... 701/200 |
| 5,699,255 A | * | 12/1997 | Ellis et al. .................. 701/212 |
| 5,717,392 A | * | 2/1998 | Eldridge ..................... 340/996 |
| 5,757,916 A | * | 5/1998 | MacDoran et al. ......... 380/258 |
| 5,892,454 A | * | 4/1999 | Schipper et al. ........ 340/825.37 |
| 5,901,352 A | * | 5/1999 | St-Pierre et al. ............ 455/426 |
| 5,905,450 A | * | 5/1999 | Kim et al. ................... 340/967 |
| 5,959,577 A | * | 9/1999 | Fan et al. ............... 342/357.13 |
| 5,982,281 A | * | 11/1999 | Layson, Jr. ................. 340/539 |
| 6,150,961 A | * | 1/2000 | Alewine et al. ............ 340/995 |
| 6,023,241 A | * | 2/2000 | Clapper ................ 342/357.13 |
| 6,026,375 A | * | 2/2000 | Hall et al. ..................... 705/26 |
| 6,028,514 A | * | 2/2000 | Lemelson et al. .......... 340/539 |
| 6,046,689 A | * | 4/2000 | Newman ..................... 340/996 |
| 6,049,711 A | * | 4/2000 | Ben-Yehezkel et al. ...... 455/414 |
| 6,073,075 A | * | 6/2000 | Kondou et al. ............. 701/203 |
| 6,088,598 A | * | 7/2000 | Marsolais ................... 455/566 |
| 6,091,956 A | * | 7/2000 | Hollenberg ................. 455/456 |
| 6,115,611 A | * | 9/2000 | Kimoto et al. .............. 455/456 |
| 6,122,520 A | * | 9/2000 | Want et al. ................. 455/456 |
| 6,140,943 A | * | 10/2000 | Levine ........................ 340/995 |
| 6,151,505 A | * | 11/2000 | Larkins et al. .............. 455/456 |
| 6,166,685 A | * | 12/2000 | Soliman ................... 342/357.1 |
| 6,222,483 B1 | * | 4/2001 | Twechell et al. ....... 342/357.09 |
| 6,236,933 B1 | * | 5/2001 | Lang ........................... 701/117 |

OTHER PUBLICATIONS

Falkenberg et al., "The AirStar —a precision GPS parallel swath guidance and tracking system", IEEE Symposium, ISBN: 0–7803–1435–2, pp. 274–283, Apr. 1994.*
Baudhuin, E.S., "Telemaintenance Applications for the Wearable PC", IEEE Conference, ISBN: 0–7803–3385–3, pp. 407–413, Oct. 1996.*
Elhakeem, A.K., "MYMAR, A new Mobile Yellow Page Messaging and Retrieval, The Advent of the Local Wireless Internet", IEEE Conference, ISBN: 0–7803–5957–7, pp. 1014–1017, Mar. 2000.*

* cited by examiner

*Primary Examiner*—Zarni Maung
*Assistant Examiner*—Jason D. Cardone
(74) *Attorney, Agent, or Firm*—Donald R. Boys; Central Coast Patent Agency, INC (57) ABSTRACT

A system for delivering position-related information from a data repository to a user includes a computerized appliance for receiving and reporting the position-related information to the user, a data repository remote from the appliance for storing information related to the position of the computerized appliance, a system for determining the position of the appliance, and a wireless communication link between the data repository and the appliance. The position-determining system tracks the position of the appliance, and in the information is selected and provided to the appliance from the data repository based on the determined position. In one embodiment position is determined by a GPS system integrated with the appliance, aid information is selected by an Internet service and sent to the appliance based on the reported position, via a cellular telephone Internet link between the server and the appliance. In other embodiments position is determined by a local indoor system.

11 Claims, 4 Drawing Sheets

INTERNET SYSTEM FOR CONNECTING CLIENT-TRAVELERS WITH GEOGRAPHICALLY-ASSOCIATED DATA

FIELD OF THE INVENTION

The present invention is in the field of Internet services and business models, pertains more particularly to apparatus, methods, and models for providing a service tracking geographic location of clients of the system, and providing information to the clients based on the tracked location.

BACKGROUND OF THE INVENTION

The well-known Internet and the subset of the Internet known as the World Wide Web (WWW) is arguably the greatest present net repository and source of information available to persons enabled by suitable equipment to and connect to myriad Internet servers and download information. Enabling equipment for end users include all computerized machines capable of establishing an Internet connection and of asserting addresses known as Universal Resource Locators (URLs) to connect to individual servers and pages on servers (Web pages), and of communicating in the language of the Internet. Such enabling equipment may be broadly termed Internet appliances, and include in aggregate large Internet-connected servers (which may be enabled to browse and connect to other Internet servers), desk-top personal computers, which typically connect to the Internet through telephone lines and Internet Service providers (ISPs), Web TVs, computerized set-top boxes typically using cable services for connection, and a wide variety of portable computerized units (portable computers).

The latter category of portable computers is of primary interest in the present invention, and includes an increasingly diverse set of equipment taking a variety of names. Among these are laptop computers, palmtop computers, hand-held computers, personal digital assistants (PDAs), personal organizers, cellular telephones, and many more. To fall into the class of Internet appliances it is only required that such portable units be enabled to connect somehow to the Internet backbone, and be able to browse the Internet through some level of executable software, which ability may be enhanced or largely provided by Internet-connected proxy machines.

The Internet and Internet-related enterprise services, as of the time of the present patent application, have been growing at a very great rate, and one important reason for emergence of many new services is the sheer volume and resulting granularity of the Internet. A person accessing the Internet can be reasonably assured that the information he or she might seek is out there somewhere. Finding it, however can be another matter entirely.

A broad variety of services have been developed to help individuals locate information on the Web, among them quite sophisticated browser software executable on the end-user's Internet appliances, powerful search engines available on proxy servers to browse for subscribers and other clients, and indexing and listing services which attempt to track and cross-reference Internet information sources. For the purposes of the present specification, a client is a person who uses a service, while a subscriber is a client who registers and/or pays for using a service Even with enormous effort going into new and better indexing and searching services, partly because of the rate of growth of sources and end users as well, there has been but little improvement in ability to quickly find and easily access information on the Web.

Browsing the Internet can still be a daunting task, especially for the relatively uninitiated client. The present inventors have recognized, therefore, a need to narrowly focus information services to provide highly specialized information specific to needs of groups of individual clients, and automatically or semi-automatically provided to such clients.

SUMMARY OF THE INVENTION

In a preferred embodiment of the present invention a system for delivering position-related information from a data repository to a user is provided, comprising a computerized appliance for receiving and reporting the position-related information to the user; a data repository remote from the appliance for storing information related to the position of the computerized appliance - a system for determining the position of the appliance; and a wireless communication link between the data repository and the appliance. The position-determining system tracks the position of the appliance, and in that information is selected and provided to the appliance from the data repository based on the determined position.

In some embodiments the position-determining system is a GPS receiver at the appliance determining the position of the appliance on the Earth's surface, and the appliance comprises a cellular telephone link to the Internet for establishing communication with an Internet server having access to the data repository. Also in some embodiments the Internet server selects information from the data repository based on position and dynamic changes in position of the appliance, as determined by the server from reported position relative to time.

In some embodiments the position-determining system is constrained to an indoor facility, including a wireless communication link to the appliance, and the appliance comprise s a cellular telephone link to the Internet for establishing communication with an Internet server having access to the data repository.

In another aspect of the invention a method for delivering position-related information from a data repository to a user is provided, comprising steps of (a) storing information cross-referenced to geographic position in a data repository; (b) determining position of a computerized appliance by a position-determining system cooperating with the appliance; and (c) retrieving information from the data repository and sending the retrieved information to the appliance, based at least in part on the position of the appliance.

In some embodiments of this method there is a further step (d) for reporting the information sent to the appliance to the user. In preferred embodiments step (b) is periodically repeated, followed by steps (c) and (d). In some embodiments, in step (a) the position-related information is stored in a data repository accessible to an Internet-connected server, the position-determining system in step (b) is a global satellite positioning (GPS) system implemented in the appliance, and in step (c) information is retrieved by the Internet-connected server and relayed to the appliance via a cellular telephone enabled Internet link. Also in some embodiments, in step (b) the position-determining system is constrained to an indoor facility communicating on a local wireless link with the appliance. In some of these embodiments the data repository is associated with the indoor facility, and data is retrieved and sent to the appliance on the wireless link. In others the positioning system is local, and the information is stored and retrieved at an Internet service.

In embodiments of the invention, described in enabling detail below, for the first time a system is provided for tourists and other travelers, that is capable of presenting information to the travelers based on the traveler's position, as determined by a portable device.

DESCRIPTION OF THE PREFERRED EMBODIMENTS

Figure 1:
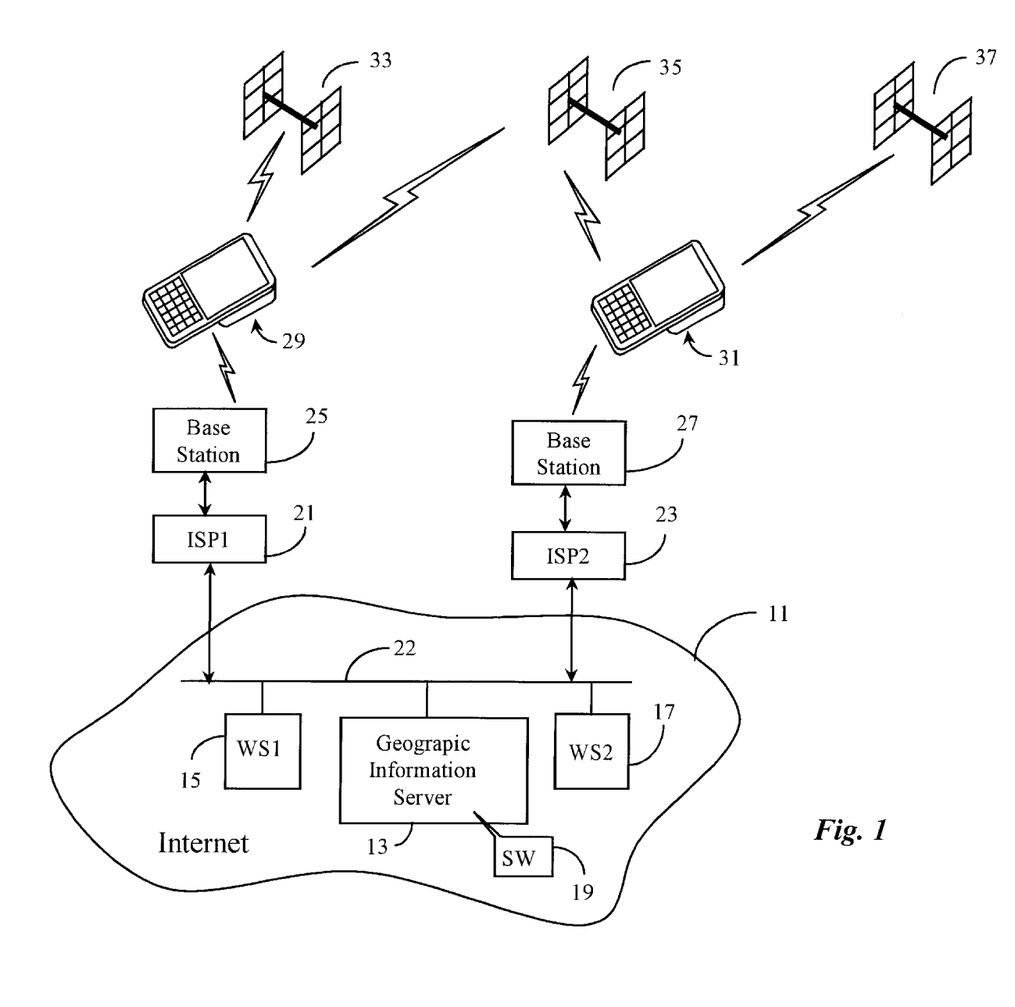
FIG. 1 is a block diagram illustrating an exemplary architecture for a service and business model according to a preferred embodiment of the present invention.

FIG. 1 is a block diagram illustrating an exemplary architecture for an Internet-implemented service and business model according to a preferred embodiment of the present invention. In this system a service is provided on an Internet-connected server 13 in the well-known Internet network represented by cloud 11. The service provided is particular to travelers, such as, for example, tourists, who are enabled typically with unique, hybrid hand-held units that are capable of informing server 13 regarding specific geographic location of the units, and therefore the person (client) using each unit.

In FIG. 1 two client's appliances 29 and 31 are represented as portable, hand-held computer units. In this embodiment each of units 29 and 31 are Palm™ hand-held computers enabled to connect to the Internet through integrated cellular telephone equipment via base stations. Unit 29 connects through base station 25 and ISP1 21 to Internet backbone 22, which represents all of the loosely defined interconnections of nodes and servers worldwide.

Base station 25 represents many base stations in a cellular telephony provider's network of such stations enabling cell user's to connect typically to a public switched telephone network (PSTN), hence to an ISP and to the Internet backbone. In some cases the cellular provider may provide the ISP service directly. The skilled artisan will recognize this diagram is exemplary, and will be aware of the various ways this wireless connection may be implemented.

Unit 31 connects to Internet backbone 22 via representative base station 27 and ISP2 23. As users of units 29 and 31 move about geographically, as long as the units are on and powered, wireless connection may be maintained by connection through different stations in the cellular provider's base station network.

Figure 2:
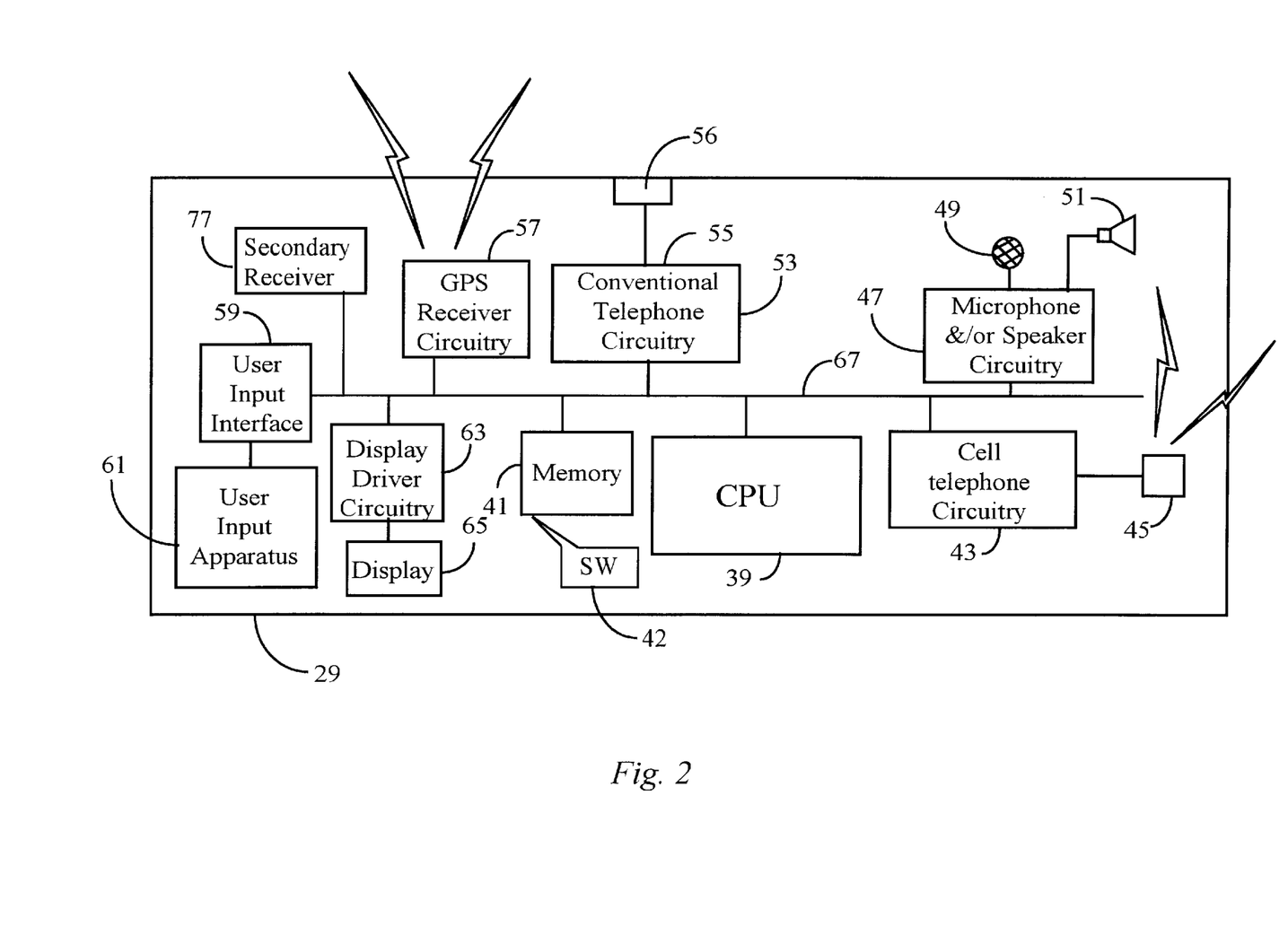
FIG. 2 is a diagram of basic elements of an Internet appliance of FIG. 1.

FIG. 2 is a block diagram of internal elements of hand-held unit 29 of FIG. 1, including exemplary connectivity. The present invention pertains most particularly to portable computing units, of which there are many varieties, as described above in the background section. In a preferred embodiment unit 29 is a modified or enhanced Palm™ hand-held computer. In this preferred embodiment the unit has cellular telephone circuitry which serves as a connection path for Internet communication, and this combination is known in the art.

Unit 29, as shown in FIG. 2 has a central processing unit (CPU) 39 and a system memory 41 communicating on an internal bus 67. The CPU and the nature of the memory will vary depending upon the nature of unit 29. The CPU, for example, may be an Intel Pentium™ microprocessor if unit 29 is a portable laptop computer. memory 41 may include read-only memory (ROM), such as a basic input-output system (BIOS), random access memory (RAM) for temporary storage, and non-volatile memory such as a hard-disk drive or a flash memory, or any combination of known memory-storage apparatus.

In a preferred embodiment a cellular telephone circuitry 43 connected to bus 67 and operating through an antenna 45 provides connection to a public switched telephone network (PSTN) through a cellular telephony provider's network as described above, hence to an Internet service provider such as ISP1 or ISP2 of FIG. 1, to Internet backbone 22 (also FIG. 1). Unit 29 is enhanced with Internet browser software (not shown) to be able to access and browse the Internet world. In some embodiments the browser software is a commercially available product, and in other embodiments may be an available browser enhanced with one or more plug-ins according to embodiments of the invention, and in yet other embodiments may be wholly provided as unique software according to embodiments of the present invention.

In some embodiments conventional telephone circuitry 53 is provided connected to a telephone connector 56, for Internet access, and this circuitry may be in addition to or in lieu of circuitry 43. For example, a laptop computer enabled to practice the present invention may have only circuitry 55, comprising a data modem and, in some cases voice circuitry as well, while a Palm™ implementation may have only the cellular connection apparatus.

Common to most implementations of unit 29, there will be display driver circuitry 63 and a display 65, for displaying information from Internet sources as well as for performing other routine output functions, and a user input interface 59 and input apparatus 61. Input apparatus 61 comprises, for example, a keyboard and a pointer device. In some embodiments of unit 29 there will be one or both of a microphone and speaker circuitry 47 and one or both of a microphone 49 and a speaker 51.

Common to all examples of units 29 and 31, there is a GPS circuitry 57 for receiving signals from multiple GPS satellites and for determining a location for the unit from the satellite signals. Such GPS systems are known in the art, but not necessarily in combination with other elements as disclosed herein. GPS system 57 communicates on bus 67, and the net effect is, that in operation, the geographic position of unit 29 on the Earth's surface, accurate to within a few feet at the most, is available to CPU 39 at all times that the unit is in operation.

In some (OEM) embodiments of the invention the GPS apparatus is integrated into the circuitry of the portable units. In others, an add-on GPS unit is provided that may be attached to and connected to an existing portable unit already having the cell-telephone capability. In still other cases an add-on unit may be provided that adds cell-telephone capability and GPS capability to an existing portable computing unit that has neither capability. Such add-on units may connect through a standard serial port, a universal serial port (USB), a parallel port, such as the port typically used for printers, and so on, Physical attachment may be made in a number of ways so the resulting assembled unit is convenient to use.

In practice of a preferred embodiment of the present invention specific information is transmitted (downloaded) from, through, or initiated by Internet server 13 in response to requests from a portable unit (29, 31), the request in some embodiments is accompanied by global positioning data defining the global position of the requesting unit. In a preferred embodiment the portable unit (29, 31) is enhanced with software 42 that, among other duties, accesses the Internet and asserts the URL of server 13 when the unit is powered on. Thenceforth periodic requests are transmitted from the portable unit along with GPS position, updating the info to server 13. In other embodiments so aware 42 may provide a user interface allowing the user to select the service of the present invention, such as by selecting an icon on a desktop screen, as is known in the art, to initiate the service of the invention.

Software 42 operating on the user's appliance may take many forms, and may have many functions and duties, many of which are described in more detail below. This software, in general, is fashioned to provide a user interface and information presentation functions particular to the embodiments of the invention.

It will be apparent to the skilled artisan that requests from portable units may be identified as specific to individual units (ID) in several ways. The typical protocol for such requests, for example, includes transfer of a cookie which may identify the individual unit. Processes and protocols for log-in and authentication are well-known in the art, and new processes are being developed to make the process more secure as well as more transparent to the user.

Referring now back to FIG. 1, a client using unit 29, for example, moving about geographically, with unit 29 on and operating, is connected to server 13 through Internet backbone 22, which represents all of the loosely defined Internet connection and interconnection pathways. Server 13 may have local access to a data repository of any convenient type and size, upon which may be stored any convenient information. Server 13 also has access through backbone 22 to the rest of the Web, represented by Web servers WS1 15 and WS2 17, which may have access to other databases and yet other repositories.

In a preferred embodiment a service is provided to such as tourists and other travelers, wherein information of, for example, historical interest is stored accessible to server 13 and indexed by global position, and in some cases also by dynamics of global position.

As an example of such a service, a tourist, also a client of a service according to an embodiment of the present invention, may be making a walking tour of Colonial Williamsburg in the U.S. state of Virginia. Colonial Williamsburg, as is well-known, is a superbly-maintained historical site presenting buildings and artifacts pertaining to the original settlements by Western Europeans along the James river in Virginia, and includes the Jamestown colony, first peopled during the reign of James the First of Britain in the early part of the 17th century, considerably prior to the landing of the pilgrims at Plymouth in the state of Massachusetts. The landing of the pilgrims, by the way, occurred on the outer island of Cape Cod, and these pilgrims were originally bound for the Jamestown site.

This tourist, for example, may be presented with information pertaining to items of very local interest. The tourist, a client of the enterprise host of server 13, may be walking along the James river on the plot known as Martin's Hundred, which was established in 1617 by a group from London, arriving on the ship Gift of God. This client will be pushed information about the history of Martin's Hundred, the people who participated, and what happened there.

In a preferred embodiment, because GPS positioning is quite accurate, down to at most an error of less than three feet, the granularity of the information selection can be quite high. For example, as the client walks or rides in broad areas of Martin's hundred not immediately adjacent to any specific, more limited (lower-level) historical site, information of a general nature is pushed to the client's portable device. As the client nears John Boys' house on the banks of the James river, specific information about John Boys (who was titular head of Martin's Hundred for a time) and his family will be pushed. As the client walks toward a trash pit near this site, where archaeologists have discovered the remains of a servant of the Boys household, who crawled there, grievously injured, during the Posthaste uprising in the early 1620's, hid under the refuse, and died there of her injuries, details of the Indian uprising may be pushed, along with details of this archaeological site.

The historical information pushed under these circumstances may be selected by software at server 13 based on more than the simple location of the portable unit. The direction of change in location may be used as well, and the rate of change, and other dynamics derivative from location and time. The information pushed, for example would be different if the client walks toward the rubbish site from the Boys' house, as opposed to walking from the rubbish site towards the house. In the first case the info would be about the rubbish site, and associated information, and in the second about the house and its occupants, even though the actual GPS position may be the same. The use of the dynamic data in information selection and granularity is unique.

As an example of a use of rate of change, a client at Martin's Hundred might well move from site to site on an electric cart, or by automobile, and walk around at each site. In such a case, the software at server 13 may present information quite differently. If the client is seen to be moving at a rate consistent with a vehicle, the service can provide site-to-site information, scripted also by direction of movement. If the client is seen to be moving at a walking rate, the information is more granular and specific, related to an individual site, and so forth.

There are many variations in practicing the invention that may depend, for example, on the nature of the client's Internet appliance (that is, its capabilities and characteristics), and this client-profile information may be available to the service at server 13, and be accessed to determine what to push to a client, and how to push it. For example, in some embodiments a client may be using a laptop computer connectable to the Internet only through a standard telephone connector and modem. The laptop computer in this case, of course, to practice the invention, is enabled by a GPS system, so, when connected to server 13, the laptop reports its position. If the client is a subscriber, the client's profile, stored at server 13, will indicate the nature of the laptop and connectability, and information will be selected and pushed at a relatively high and general level, as suitable for the situation.

A lot of detail about the nature of historical information to be made available to clients is not necessary in this specification. The volume of such information, concerning civil war sites, genealogical sites and information, historical sites in other parts of the world (Western Europe, for example, and much more, is readily available to imagination of the skilled artisan.

Information to be indexed by geography (location) is certainly not limited to historical information, but extends to many other kinds of information, and the type of information to be provided may be selectable by a client. Archaeological information may be provided, including Information about local geography, mineral deposits, water supplies and the like. Information about local government offices, local cemeteries, local museums and exhibition sites, and so forth may be prepared and made available to clients. Another information shell could be organized around economic information, such as local industry, small businesses, and the like. Historical data about a region may be organized around not only geographical position, but relative to time as well. For example, all sorts of data as mentioned above may be provided for any different period of time (era) that a client may desire. There are thus a vary great variety of information shells and granularity relative to geographic position, time frame, and real time that may be organized and made available to clients. All such data is organized in the provider's database, or in databases accessible to the host of the service.

It is well-known that presently-available GPS systems are workable only out-of-doors, while cellular telephone systems typically work quite well indoors. This is in part because signals from satellites or diffuse, and therefore the signal strength at any point on the Earth's surface is relatively low, while cellular telephone signals are much stronger. It is also well known that many sites of interest to tourists and travelers, where information may well be organized by location, are inside buildings where GPR may not be serviceable directly.

As an example of an indoor exhibit where an embodiment of the present invention would be quite useful, consider the Metropolitan Museum of Art in Manhattan, NYC, on the upper East Side (about 81st and Fifth Avenue on the Central Park side). This museum is in very large buildings and typically has a large number of exhibits for divergent interests. There are, for example, collections of armor and weaponry, collections of paintings organized by type, by artist, and in other ways, visiting collections of art and artifacts from other countries and cultures, and so forth. For the purposes of this invention, information about all of the exhibits at this museum may be indexed according to geographic location in the buildings, which may be accessed selectively if one has a portable unit requesting such information from a database while simultaneously reporting the device's relatively precise position in the museum.

Figure 3:
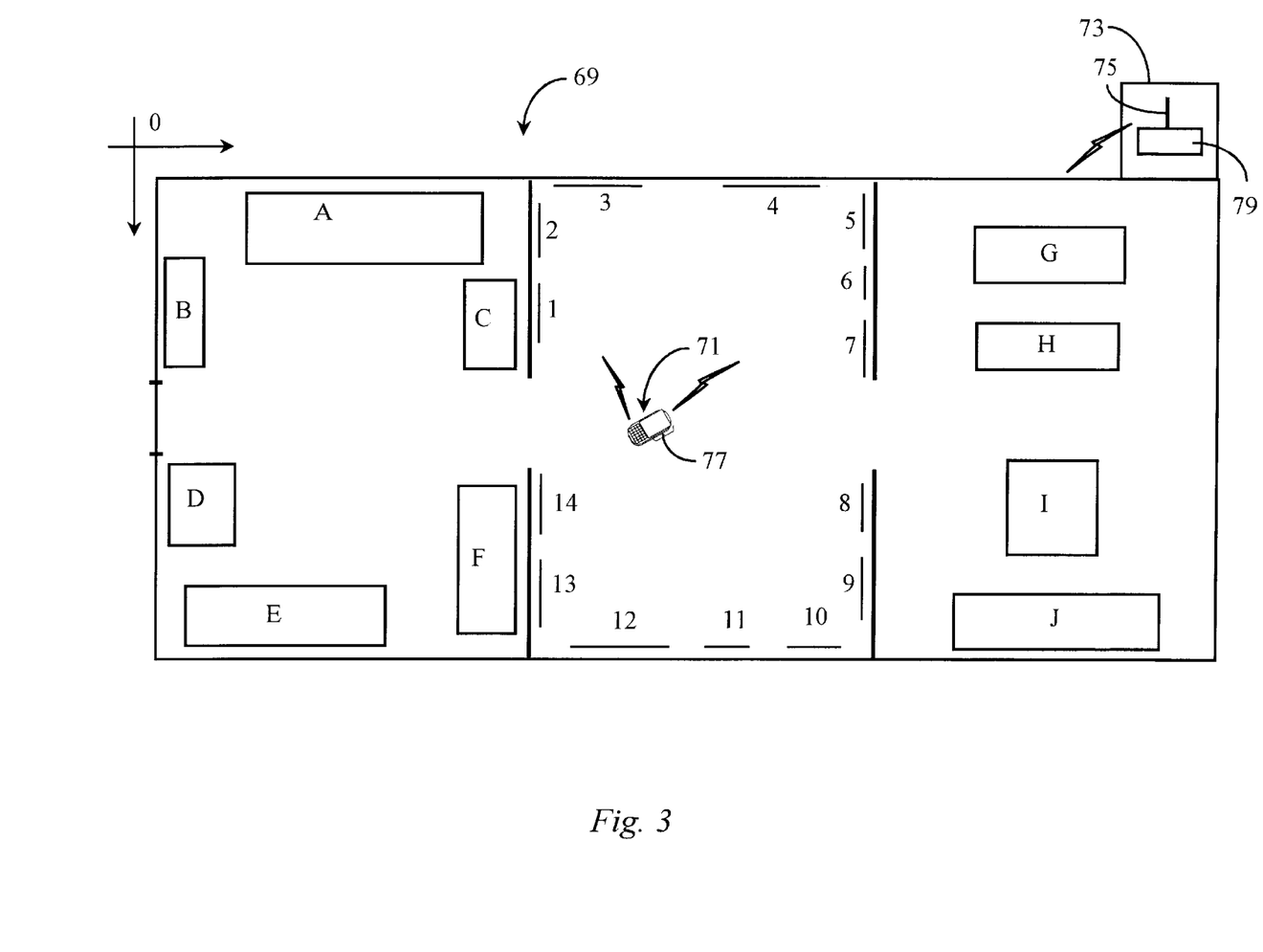
FIG. 3 is a plan view of an indoor exhibition facility in an embodiment of the present invention.

FIG. 3 is a plan view of a simple, exemplary indoor exhibiting site 69 with indoor exhibits organized in specific locations within the site, according to an embodiment of the present invention. There is an entrance/exit in this example, and there are three exhibit rooms, as shown in the figure. Exhibits in cases A through J are arranged in rooms 1 and 3, and paintings 1 through 14 are hung on the walls of room 2. All exhibits may be documented in an information database by location from an arbitrary reference point, such as point 0 as shown at the upper left corner of site 69. This is a simple Cartesian reference system listing locations of exhibits in two dimensions from reference point 0. In other embodiments there may be a three-dimensional reference system, allowing for differentiation of exhibits on multiple levels of a multi-storied exhibit site, or any known sort of planar or spatial reference system.

In this embodiment of the invention a secondary communication link is opened between Internet appliance 71 and a location system 73 provided by the host of the indoor exhibit. The purpose of this communication is to establish the position and dynamics of movement of a user of appliance 71 within the confines of the indoor exhibit, The skilled artisan will recognize that there are alternative ways this may be done. In one embodiment a secondary receiver is provided in appliance 71 receiving on an RF frequency common to sending equipment used for the purpose by cooperating enterprises that host indoor exhibits. This receiver is represented in FIG. 2 by secondary receiver 77. Multiple stations within the exhibit premises may be used with triangulation techniques for tracking movement of users, for example. In another alternative embodiment there may be small transmitters of limited range at strategic points within the exhibit premises, and the appliance may determine its position according to signals received by secondary receiver 77, much as a GPS system does.

Within the indoor facility appliance 71 with secondary receiver 77 communicates with station 73 via antenna 75 and circuitry 79. This facility is meant to be representative of any wireless indoor system capable of locating a user's appliance relatively precisely within an indoor facility.

In one embodiment the secondary position system simply determines the position of the user of appliance 71 within the exhibitors facility, and this information is passed to server 13 on the Internet. Server 13 is informed not only of this position, but of the fact that this is not a GPS position, and also the ID of the exhibition facility. In this embodiment the host of the service provided by server 13 maintains, with cooperation of the host of the exhibition facility, a database relating exhibits according to geographic and spatial position within the facility, and returns information to the appliance user relating to the various exhibits.

Again, dynamic position information may be used to relate to the database as well as simple position within a facility. For example, the fact of a user traversing from one room to another may elicit information pertaining to the nature of exhibits in the room being approached, while the fact of a user stopping for a predetermined time before a specific exhibit may elicit information about that specific exhibit, and so forth. In this alternative embodiment, the database for the exhibit may be maintained and updated by the host of server 13 with input from the host of the exhibit facility.

In an alternative embodiment server 13 may simply establish an Internet connection to an Internet-connected source maintained by the host of the exhibit, and, through cooperative software and communication protocol, the information is pulled from the exhibitors facility and pushed to the user of the appliance via the cellular Internet connection.

In yet another embodiment the entire information service for an indoor exhibition facility is provided at the facility, and system 73 at the facility determines not only the user's position, but pulls the information and pushes it to the user via the communication link between element 77 and system 73. In some cases element 77 in the user's appliance may be a transmitter as well as a receiver.

Referring now back to FIG. 2, the typical appliance in embodiments of the present invention has a speaker 51 and a microphone 49. These elements may be used with suitable software and the like to use the appliance as a cell telephone and to accomplish computer simulated telephony over the Internet, often termed IP calls. In some embodiments information pushed to a user may be rendered as speech and announced to the user, who may use earphones or an ear-piece speaker system.

Figure 4:
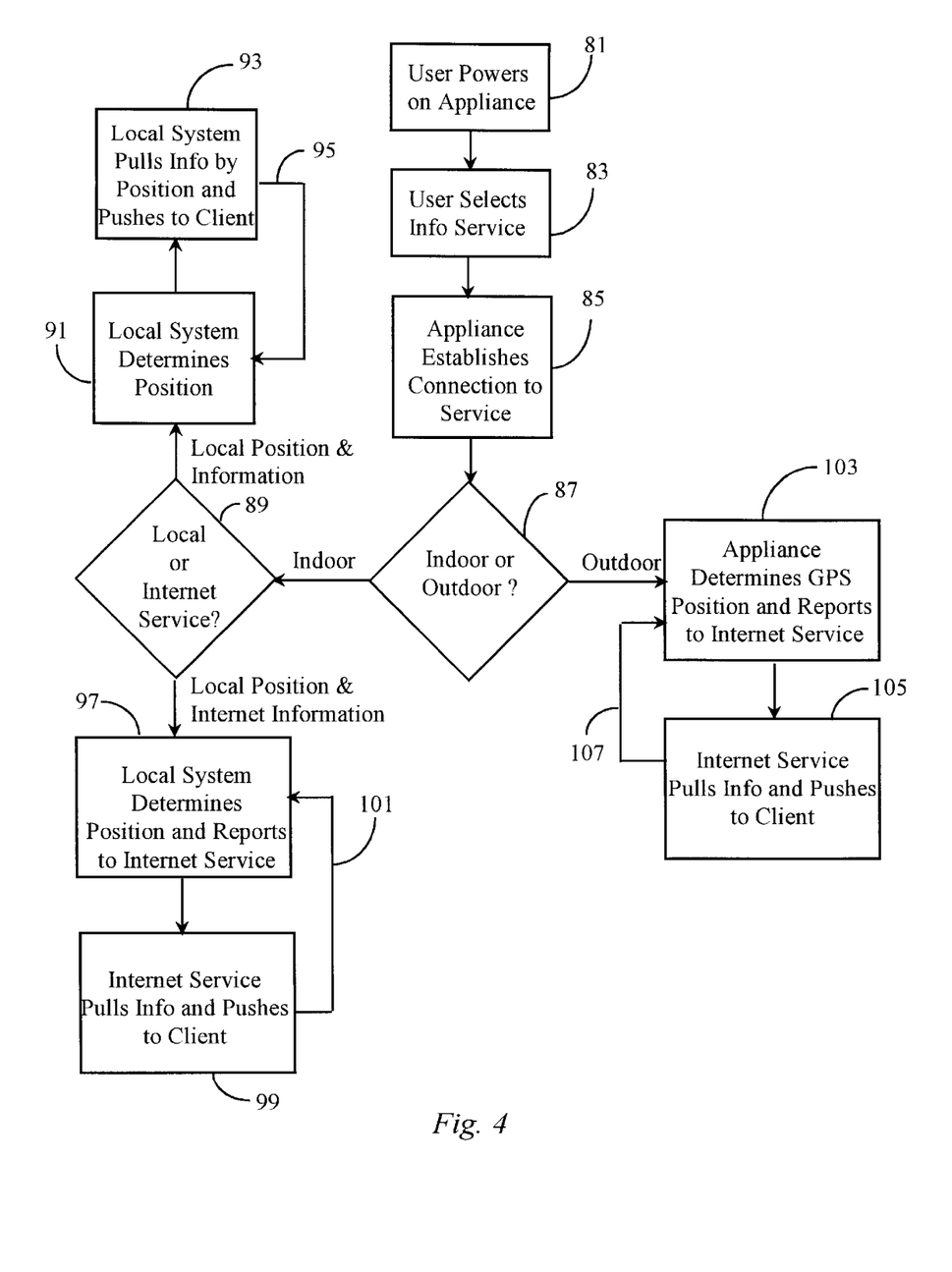
FIG. 4 is a logic flow diagram illustrating steps in practicing the invention in preferred embodiments.

FIG. 4 is a logic flow diagram illustrating a series of steps in practicing the present invention. At step 81 a user/client powers on an appliance enables according to an embodiment of the present invention. At step 83 the client selects the information service according to an embodiment of the invention. This step may not exist in some embodiments. For example, in some embodiments simply powering on the appliance will select the information service. This is a dedicated embodiment. In other embodiments the service is optional, and the appliance may be used for many other functions.

At step 85 the appliance establishes connection to the service. This connection typically involves logging onto the Internet through the cell telephone service, and making the Internet connection. It will be apparent to the skilled artisan that this may be done transparently to the user, or may require user intervention.

At step 87 the appliance determines if the service is to be for an indoor or an outdoor facility. This may be as simple as the presence or absence of a GPS signal received by the appliance's GPS system. In the event the service is indoor, the appliance will receive identifying and initializing input from the local position system.

If the application is indoor, the identification will determine in step 89 whether the particular service is local position only, with Internet information, or both local position and information. For the local position and information system, control goes to step 91, and the local system determines position, and the position, and in some cases dynamic information derived from changes in position relative to time, is used to pull information and push it to the client. The process loops (95) continuing to tell position and pass information until such time as the user intervenes, or some basic parameter changes. Although this loop is shown as between steps 91 and 93, in reality the loop may be back to, for example, step 87 at least periodically, so, if the client exits the building, the system may switch to the outdoor service.

If at step 89 the determination is that the service is local position but Internet information, the appliance determines local position at step 97 (communication with local position system) and passes the position data to the Internet service, which pulls info and pushes it to the client at step 99. Again, dynamic data may be determined and used as well, as previously described, and the system continues to loop (101) re-determining position and continuing to access and push information. The loop may periodically revert at least to step 87 as well, as also previously described.

If, at step 87 it is determined that the appliance is out-of-doors, which may be determined by the access to and strength of a GPS signal, control passes to step 103, where the appliance determines the GPS position and passes that to the Internet service, which pulls the relevant information at step 105 and pushes it to the client.

It will be apparent to the skilled artisan that the flow diagram of FIG. 4 is but one rendition of steps that may depict practice of the present invention in various embodiments. The order of steps may vary in different embodiments, some steps shown in FIG. 4 may not be present in some other embodiments, and in some embodiments there may be steps not shown in FIG. 4.

Intermittent Service

In an alternative embodiment of the present invention, useful in situations where Internet access may not be readily available on a continuing basis, or may be relatively expensive, portions of a database maintained by a host of the service may be downloaded by a user/client, based on current or expected location, and stored locally accessible to the client's portable unit. In this case a user interface allows the client, while maintaining Internet access, to specify the kind of information desired and the geographic location of interest. The relevant information is then downloaded, such as, for example, information about Colonial Williamsburg or the Metropolitan Museum of art. The client, having the relevant information stored locally, such as on a flash card, floppy disk, or hard disk drive, may then operate in the specific area, accessing the locally-stored information by real-time GPS position, just as in the Internet-connected situation described above.

Advertisement

The inventor recognizes that broad practice of the present invention will create a new opportunity for commercial enterprises to advertise products and services. Such advertisement in Internet models and services is at present quite well-known. Practice of the present invention, however, presents a unique opportunity for adding a previously unknown dimension to such advertisement. Now advertisement can be focused for services desirable to tourists and other travelers to just such persons, these being people enabled by the apparatus and service of the present invention, and moreover, offers of products and services to the enabled portion of the population can be made in a geographically-focused manner.

As an example of geographic focusing of advertisement, consider the traveler previously described as visiting Colonial Williamsburg, in Virginia. Such a tourist will likely have made arrangements (reservations) in advance for travel and overnight accommodations. This does not mean, however, that the person is completely satisfied with the arrangements. The actual aspect of accommodations after arrival, compared to what was advertised, is frequently one of the big surprises of a trip.

Because travelers may become dissatisfied with arrangements made in advance, there is good reason to suppose that some may be moved to change those accommodations if good information is presented. In an embodiment of the present invention, therefore, the host of the Internet-based service or of the indoor facility that pushes its own information locally to enabled clients, may arrange with hotels, motels, tour services, eateries, and the like, also indexed and selectable by geography, to provide advertisements to the enabled clients. The traveler visiting Colonial Williamsburg may be presented with availability of overnight accommodations, restaurants, and the like, in the immediate vicinity of Colonial Williamsburg.

There are a number of ways that advertisements may be focused and presented without being offensive to the travelers. For example, in one embodiment all advertisement is pushed to the traveler's portable unit, and cached in memory 41 (FIG. 2) under control of software 42. A display interface is provided (such as a selectable icon) that allows the traveler to access the advertisements as desired. It is left up to the traveler to determine the access. For example, at lunch time, or when hunger strikes, the traveler may simply access the cache and peruse a short list of local lunch establishments. Alternatively, the caching of such advertisements may be made at the Internet-based service for the traveler and based on the traveler's position as reported by virtue of the GPS capability. In this case the traveler accesses the cache through Internet request rather than from the local memory of the portable unit.

The geographic filtering nature of the service of the invention creates further selectability and granularity that may be of large advantage to both travelers and advertisers. For example, advertisements sent to the traveler's portable device may be updated as the traveler moves about, so that advertisements outside of the traveler's instant location are not presented. In the embodiment described wherein advertisements are cached and the traveler is given a measure of control over the access and display, ads are removed from the cache as the traveler moves about, this movement reported to the service by virtue of the GPS capability.

There is still further service that may be provided for travelers. In the case of advertisement, the service can arrange with advertisers to keep a record of availability of services offered by the advertisers, such as rooms available at a bed-and breakfast. A traveler looking for a better accommodation may then make arrangement (reservation) through the information service of the present invention. The same applies to dinner and lunch reservations, tour services, who may advertise their schedules and availability, and so forth.

In yet another embodiment of the invention services may be provided to both travelers and advertiser clients based on the identification and location of the travelers using the hosted service. The service, by virtue of transmission of and return of cookies by a client, knows where the client is and, in some cases, where the client is going to be. Arrangements may be made with such as large exhibitors, such as in the example of the Metropolitan Museum of Art described above, to notify the exhibiting hosts of the presence of or pending arrival of clients of the service, such that special offers and arrangements may be made for the individual clients, and personal service may be rendered.

The skilled artisan will recognize that there are a variety of alterations that may be made in the embodiments of the invention thus far described, without departing from the spirit and scope of the invention. For example, the nature of the appliance used may vary, with the requirement that there be a position determining system upon which selection of information may be predicated. There may be for example one of either a local position determination system (indoor application) or a GPS system; or both may be present. In the selection of information to be provided to a client, simple position may be used, or position data derived from simple position reported over time may be used, or both.

In some embodiments there may be an interface for a user to interface with the service, as exemplified at the appliance. Information may thus be cached, rather than delivered to the client in a steady stream, and the client can control the presentation, and the mode of presentation. There are many such alternatives within the spirit and scope of the invention, and the scope of the invention is therefore defined by the claims that follow.

What is claimed is:

1. A system for delivering position-related information from a data repository to a user, comprising:

a computerized appliance to receive and report the position-related information to the user a server including a data repository remote from the appliance to store and deliver the position-related information;

a system to periodically determine the position of the appliance relative to time; and a communication link between the server and the appliance;

characterized in that the position-determining system tracks the position, of the appliance relative to time, and in that information is selected and provided by the server to the appliance from the data repository based on at least two of the determined position, the rate of change of position, and the direction of change of position.

2. The system of claim 1 wherein the position-determining system is a GPS receiver at the appliance determining the position of the appliance on the Earth's surface, and the appliance comprises a cellular telephone link to the Internet for establishing communication with an Internet server having access to the data repository.

3. The system of claim 2, wherein the Internet server has access to a plurality of other Internet servers connected to a plurality of separate, remote databases for accessing and providing position related information to the appliance.

4. The system of claim 1 wherein the position-determining system is constrained to an indoor facility, including a wireless communication link to the appliance, and wherein the appliance comprises a cellular telephone link to the Internet for establishing communication with an Internet server having access to the data repository.

5. A method for delivering position-related information by a server from a data repository to a remote appliance, comprising steps of:

(a) storing position-related information in the data repository, accessible to the server;

(b) periodically determining position relative to time of the remote appliance by a position-deter mining system cooperating with the appliance; and (c) retrieving information from the data repository by the server and sending the retrieved information to the appliance, based on at least two of the position, rate of change of position, and direction of change of position of the appliance.

6. The method of claim 5 comprising a further step (d) for reporting the information sent to the appliance to the user.

7. The method of claim 6 wherein, step (b) is periodically repeated, followed by steps (c) and (d).

8. The method of claim 5 wherein, in step (b) the position-determining system is constrained to an indoor facility communicating on a local wireless link with the appliance.

9. The method of claim 8 wherein the data repository is associated with the indoor facility, and data is retrieved and sent to the appliance on the wireless link.

10. The method of claim 5 wherein, in step (a) the position-related information is stored in a data repository accessible to an Internet-connected server, the position-determining system in step (b) is a global satellite positioning (GPS) system implemented in the appliance, and in step (c) information is retrieved by the Internet-connected server and relayed to the appliance via a cellular telephone enabled Internet link.

11. The method of claim 5 wherein, in step (c) dynamic data derived from appliance position over time is used to select data to be sent to the appliance.

* * * * *